US012681885B2

(12) United States Patent
Lin et al.

(10) Patent No.: US 12,681,885 B2
(45) Date of Patent: Jul. 14, 2026

(54) PORT CONTROL IN A PARALLEL MULTI-PORT SYSTEM

(71) Applicants: Nexperia Technology (Shanghai) Ltd., Shanghai (CN); NEXPERIA B.V., Nijmegen (NL)

(72) Inventors: Yushu Lin, Danville, CA (US); Chin-jui Lin, Hsinchu City (TW)

(73) Assignees: Nexperia Technology (Shanghai) Ltd., Shanghai (CN); Nexperia B.V., Nijmegen (NL)

( * ) Notice: Subject to any disclaimer, the term of this patent is extended or adjusted under 35 U.S.C. 154(b) by 12 days.

(21) Appl. No.: 18/762,461

(22) Filed: Jul. 2, 2024

(65) Prior Publication Data

US 2025/0021507 A1     Jan. 16, 2025

Related U.S. Application Data

(60) Provisional application No. 63/513,823, filed on Jul. 14, 2023.

(51) Int. Cl.
| | |
|---|---|
| *G06F 13/40* | (2006.01) |
| *G06F 1/26* | (2006.01) |
| *G06F 9/4401* | (2018.01) |
| *G06F 13/10* | (2006.01) |
| *G06F 13/12* | (2006.01) |
| *G06F 13/42* | (2006.01) |

(52) U.S. Cl.
CPC ........ G06F 13/4068 (2013.01); G06F 9/4403 (2013.01)

(58) Field of Classification Search
CPC ........................... G06F 13/1663; H02J 7/0013
See application file for complete search history.

(56) References Cited

U.S. PATENT DOCUMENTS

| | | | |
|---|---|---|---|
| 2006/0282588 A1* | 12/2006 | Proujansky-Bell | ......................... G06F 13/1663 710/240 |
| 2013/0067195 A1* | 3/2013 | Sundrani | ............. G06F 12/0284 711/206 |
| 2013/0124707 A1* | 5/2013 | Ananthapadmanabha | .................. H04L 47/2483 709/223 |
| 2015/0054451 A1* | 2/2015 | Rokusek | ................. H02M 7/23 320/108 |
| 2015/0220416 A1* | 8/2015 | Johnson | ............. G06F 11/3034 710/19 |
| 2020/0091758 A1* | 3/2020 | Jahan | .................... H02J 7/0013 |

* cited by examiner

*Primary Examiner* — Getente A Yimer
(74) *Attorney, Agent, or Firm* — Ruggiero McAllister & McMahon LLC

(57)     ABSTRACT

A parallel multiple-port system is provided, including a plurality of ports, a plurality of processors, and a memory storing software code which, when executed by the plurality of processors causes the processors to control the plurality of ports. A first processor is configured to control a first port. A second processor is configured to control a second port. The software code includes a common software code portion relevant to the plurality of ports and for execution by the plurality of processors. The software code further includes a port specific code portion including first configuration data for the first port and for execution by the first processor, and second configuration data for the second port and for execution by the second processor. The present application can advantageously be applied to parallel multi-port charging systems.

17 Claims, 6 Drawing Sheets

100

300

400

PORT CONTROL IN A PARALLEL MULTI-PORT SYSTEM

CROSS-REFERENCE TO RELATED APPLICATIONS

This application claims the benefit under 35 U.S.C. § 119(e) of U.S. Provisional Patent Application No. 63/513,823 filed Jul. 14, 2023, the contents of which are incorporated by reference herein in their entirety.

BACKGROUND

1. Field of the Disclosure

The present disclosure relates to parallel multi-port systems. In particular, the present disclosure relates to controlling ports in a parallel multi-port system.

2. Description of the Related Art

In a parallel multiple-port charging system, multiple charging ports may be connected in parallel to a power source or power supply unit for providing a shared power pool that can be distributed among individual charging ports. This allows multiple devices—e.g., in case of a Universal Serial Bus (USB) charging system, smartphones, tablets, smartwatches, or any other USB-powered devices—to be charged simultaneously. Thus, each port can deliver its maximum rated power output independently, ensuring efficient and fast charging for each connected device.

Each port of a parallel multiple-port charging system typically operates independently and is typically controlled by a dedicated port controller. The port controllers are typically controlled by a single processor that is programmed, through software, to control the activities for all ports depending on the capabilities of each respective port.

SUMMARY

A summary of aspects of certain examples disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects and/or a combination of aspects that may not be set forth.

A typical prior art parallel multiple-port charging system uses one processor to control all activities for all charging ports, i.e., by controlling the port controllers of each port. Such use of a single processor to control all ports has a number of disadvantages. Firstly, the processor may be required to operate at a relatively high speed to ensure timely responses to each port, in particular when the processor handles all ports in serial sequence, which can result in a delay in port response time. Secondly, the software program running on the processor typically includes specific function code for each port, requiring a relatively large size of code memory due to software code being repeated for each port. Thirdly, a failure from one port may cause system failure or affect normal operation of the other ports. Fourthly, when extending the number of ports in the system, more software code needs to be added to the program, requiring even larger memory size and software development (human) resources.

The present disclosure aims to overcome the above identified drawbacks of known parallel multi-port charging systems. Hereto, a parallel multi-port system according to the present disclosure includes multiple processors working in parallel and independently, with each processor controlling a port controller of a port. Software code common to different port controllers and/or ports may be shared by the multiple processors, leaving only port specific, preferably non-sharable, configuration code in addition to the common software code.

The parallel multi-port system according to the present disclosure may advantageously be used for controlling charging ports in parallel multi-port charging systems. Alternatively, or additionally, the parallel multi-port system according to the present disclosure may be used for controlling data ports.

With the multiple processors working in parallel and independently, performance requirements of each processor may be lower compared to the one processor in the known system. Moreover, by using multiple processors, system robustness may be increased by removing the single point of failure in the single processor. By using common program code for multiple processors (and thus for multiple port controllers and/or ports), the code memory size may be reduced by removing repeated software code, complexity of software development may be decreased, chip size may be reduced (e.g., due to smaller firmware size reducing the memory size), and costs of the parallel multi-port system may be reduced.

According to an aspect of the present disclosure, a parallel multiple-port system is presented. The parallel multiple port system may include a plurality of ports. The parallel multiple port system may include a plurality of processors. The parallel multiple port system may include a memory storing software code which, when executed by the plurality of processors causes the processors to control the plurality of ports. A first processor of the plurality of processors may be configured to control a first port of the plurality of ports. A second processor of the plurality of processors different from the first processor may be configured to control a second port of the plurality of ports different from the first port. The software code may include a common software code portion relevant to the plurality of ports and for execution by the plurality of processors. The software code may further include a port specific code portion including first configuration data for the first port and for execution by the first processor. The port specific code portion may further include second configuration data for the second port and for execution by the second processor.

In an embodiment, the parallel multiple-port system may include a plurality of port controllers. Each port controller may be configured to control one of the plurality of ports. The plurality of processors may be configured to control the ports via the plurality of port controllers.

In an embodiment, the first processor may be configured to control a first subset of the plurality of ports. The second processor may be configured to control a second subset of the plurality of ports.

In an embodiment, the common software code portion may include boot codes. The boot codes may link each processor to a memory address in the port specific code portion. The memory address may point to configuration data of one port.

In an embodiment, the common software code portion may include function codes. The function codes may include a generic program of the parallel multi-port system without processor or port identifications.

In an embodiment, the ports may be charging ports.

In an embodiment, the parallel multiple-port system may further include a plurality of power loops. Each power loop may be configured to provide power to one of the charging ports.

In an embodiment, the ports may be USB ports.

According to an aspect of the present disclosure, a computer program is presented. The computer program may include instruction which, when the program is executed by a plurality of processors of a parallel multi-port system, cause the plurality of processors to control a plurality of ports, cause a first processor of the plurality of processors to control a first port, and cause a second processor of the plurality of processors different from the first processor to control a second port different from the first port. The program may include a common software code portion relevant to the plurality of ports and for execution by the plurality of processors. The program may further include a port specific code portion including first configuration data for the first port and for execution by the first processor, the port specific code portion further including second configuration data for the second port and for execution by the second processor.

In an embodiment, the common software code portion of the computer program may include boot codes. The boot codes may link each processor to a memory address in the port specific code portion. The memory address may link to configuration data of one port.

In an embodiment, the common software code portion may include function codes. The function codes may include a generic program of the parallel multi-port system without processor or port identifications.

BRIEF DESCRIPTION OF DRAWINGS

Embodiments of the present disclosure will now be described, by way of example only, with reference to the accompanying schematic drawings in which corresponding reference symbol indicate corresponding parts, in which.

The figures are intended for illustrative purposes only, and do not serve as restriction of the scope of the protection as laid down by the claims.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the present disclosure is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present disclosure should be or are in any single example of the present disclosure. Rather, language referring to the features and advantages is understood to mean that a specific feature, advantage, or characteristic described in connection with an embodiment is included in at least one embodiment of the present disclosure. Thus, discussions of the features and advantages, and similar language, throughout this specification may, but do not necessarily, refer to the same example.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure. Reference throughout this specification to "one embodiment," "an embodiment," or similar language means that a particular feature, structure, or characteristic described in connection with the indicated embodiment is included in at least one embodiment of the present disclosure. Thus, the phrases "in one embodiment," "in an embodiment," and similar language throughout this specification may, but do not necessarily, all refer to the same embodiment.

Figure 1:
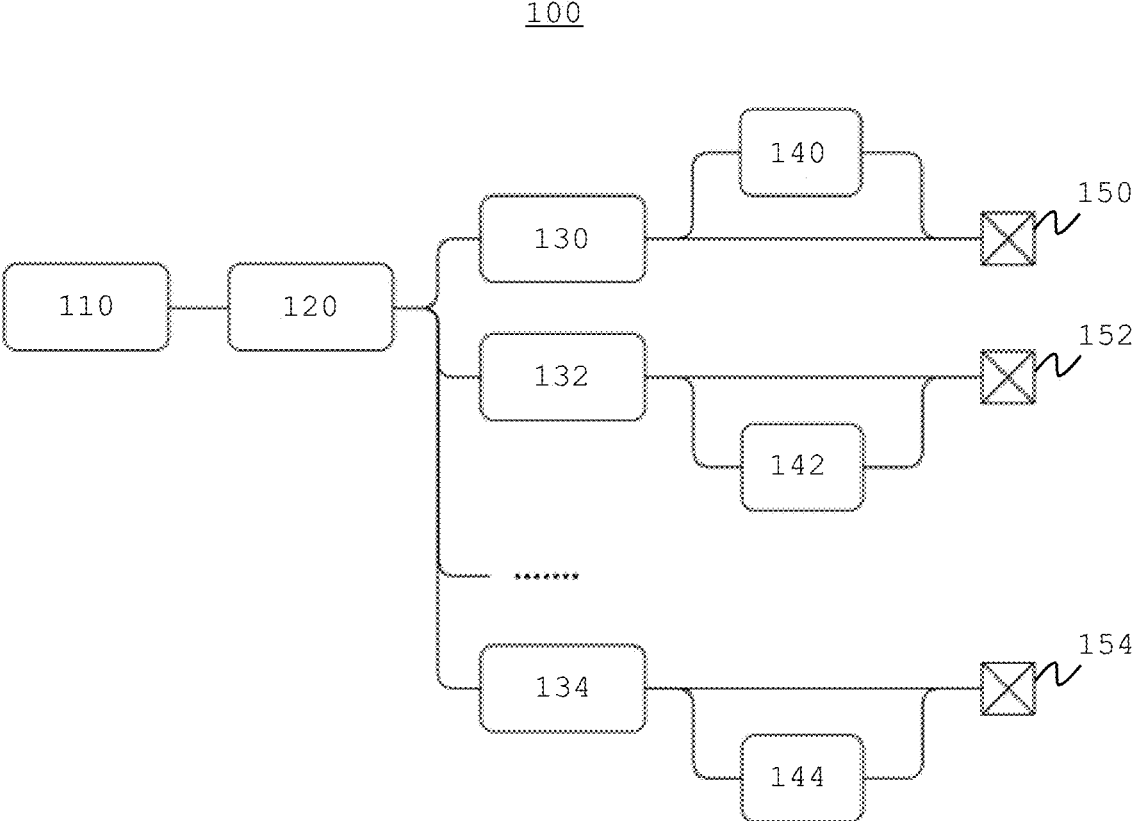
FIG. 1 shows a conventional (prior art) structure of a parallel multiple-port charging system.

FIG. 1 shows a conventional (prior art) structure of a parallel multiple-port charging system 100. Charging ports 150-154 are shown, each controlled by a port controller 130-134 and including a power loop 140-144. A single processor 120 controls all charging ports 150-154 via the port controllers 130-134. The processor operates based on software code 110. The dots indicate that there may be any number of port controllers/power loops/charging ports.

The one processor 120 of the conventional system 100 typically controls the activities of the multiple ports in a serial sequence. In a serial sequence, tasks are processed, or instructions are executed one at a time, and each task or instruction must be completed before the next one can begin (i.e., sequentially). The processor 120 typically operates at a relatively high speed (i.e., high compared to each processor in the parallel multi-port charging system according to the present disclosure) to ensure timely reaction on ports, which may require a higher-end and more costly processor.

The software code 110 typically includes specific function codes for each of the ports 150-154 and/or port controllers 130-134, resulting in repeated code in the software code 110. The software code 110 typically includes all possible combinational scenarios for all ports 150-154 and/or port controllers 130-134. As a result, when the number of ports increases, the complexity of the software code 110 may increase as well. Even when adding ports with functions similar or identical to existing ports, it may be required to add new ports' function codes to the software code 110 and modify existing software code in the software code 110.

With all ports 150-154 and port controllers 130-134 being controlled by a single processor 120, a failure in one port or port controller may result in the whole system 100 to fail and thus affect the other ports.

An example software code 110 for N ports 150-254 may be structured as follows:

```
< Software code 110 >

Port 1:
            Port 1 function codes
            .....
        Port 2:
            Port 2 function codes
            .....
        .....
        Port N:
            Port N function codes
            ...
```

Figure 2:
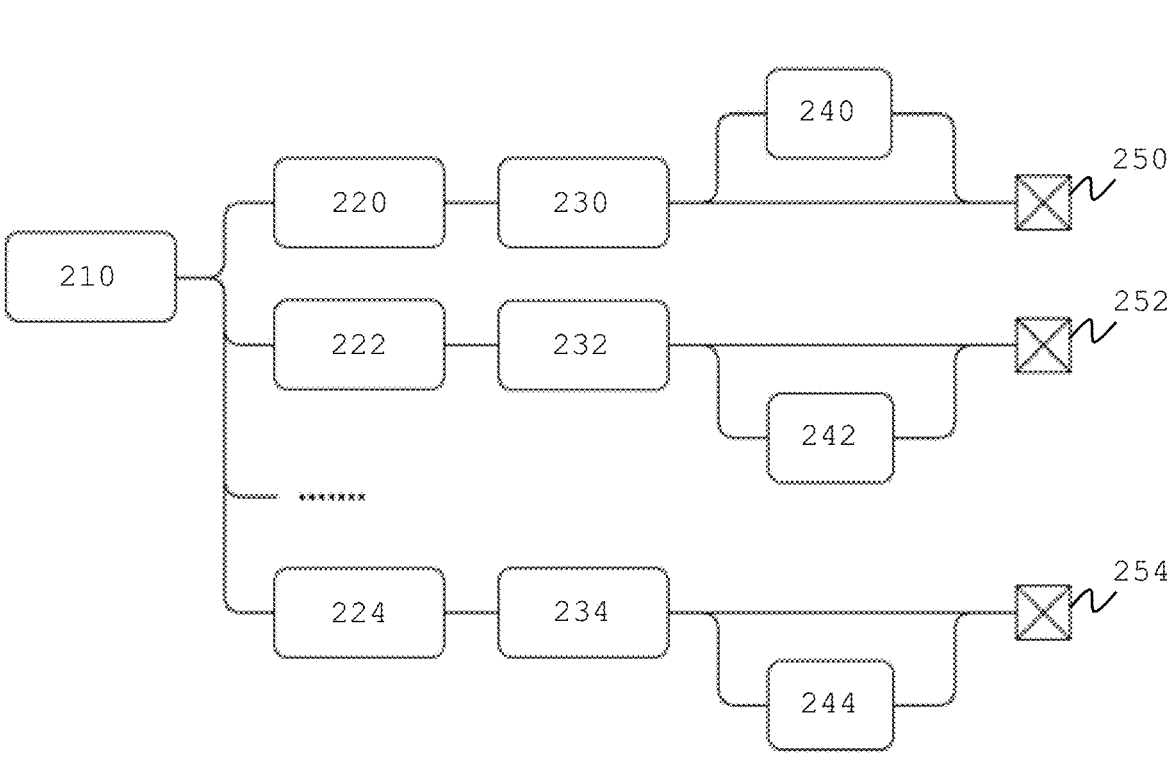
FIG. 2 shows a structure of a parallel multi-port system of an example embodiment of the present disclosure.

FIG. 2 shows a structure of a parallel multi-port system 200 of an example embodiment of the present disclosure. Ports 250-254 are shown, each controlled by a port controller 230-234. In case the ports are charging ports, a power loop 240-244 may be included per port. A power loop may be part of a port controller. Multiple processors 220-224 control the ports 250-254 via the port controllers 230-234, in this example one processor per port and port controller. The processors operate based on software code 210. Software code 210 differs from software code 110 in that it has been adapted to include a common software code portion common to all processors 220-224 (and thus common to all ports 250-254 and port controllers 230-234) and a port specific code portion including port specific software code. The dots indicate that there may be any number of processors/port controllers/power loops/ports.

In the parallel multi-port system 200, each processor 220-224 may control the respective ports' activities in parallel and may operate independently. This allows the processors 220-224 to operate at a lower speed compared to the processor 120 of the conventional system 100, thereby lowering processor requirements.

The processors 220-224 may execute the same software code 210 including unified (i.e., common) function codes and port specific configuration data, allowing much smaller size of code memory and saving in chip area even with the additional processors.

In the example of FIG. 2, each processor 220-224 controls a single port 250-254 and/or port controller 230-234. As a result, the software code 210 need not include complex scenarios for controlling multiple ports and the software code may remain relatively simple when the number of ports increases. When adding a port with existing functions to the system 200, it may not be necessary to modify the unified function code in the common software code portion. Adding port specific configuration data for the additional port to the port specific code portion of the software code 210 may suffice when adding a port to the system 200.

The processors 220-224 may operate independently to each other. A failure in one port 250-254 or a failure in one port controller 230-234 may cause the respective processor 220-224 to reboot or switch off without affecting the other ports and port controllers controlled by the other processors. As a result, the whole system 200 is much more robust compared to the conventional system 100.

An example software code 210 for N ports 250-254 may be structured as follows:

```
< Software code 210 >

Port 1-N:
            Unified function codes
            .....
        Port 1 configuration data
        Port 2 configuration data
        .....
        Port N configuration data
```

Figure 3:
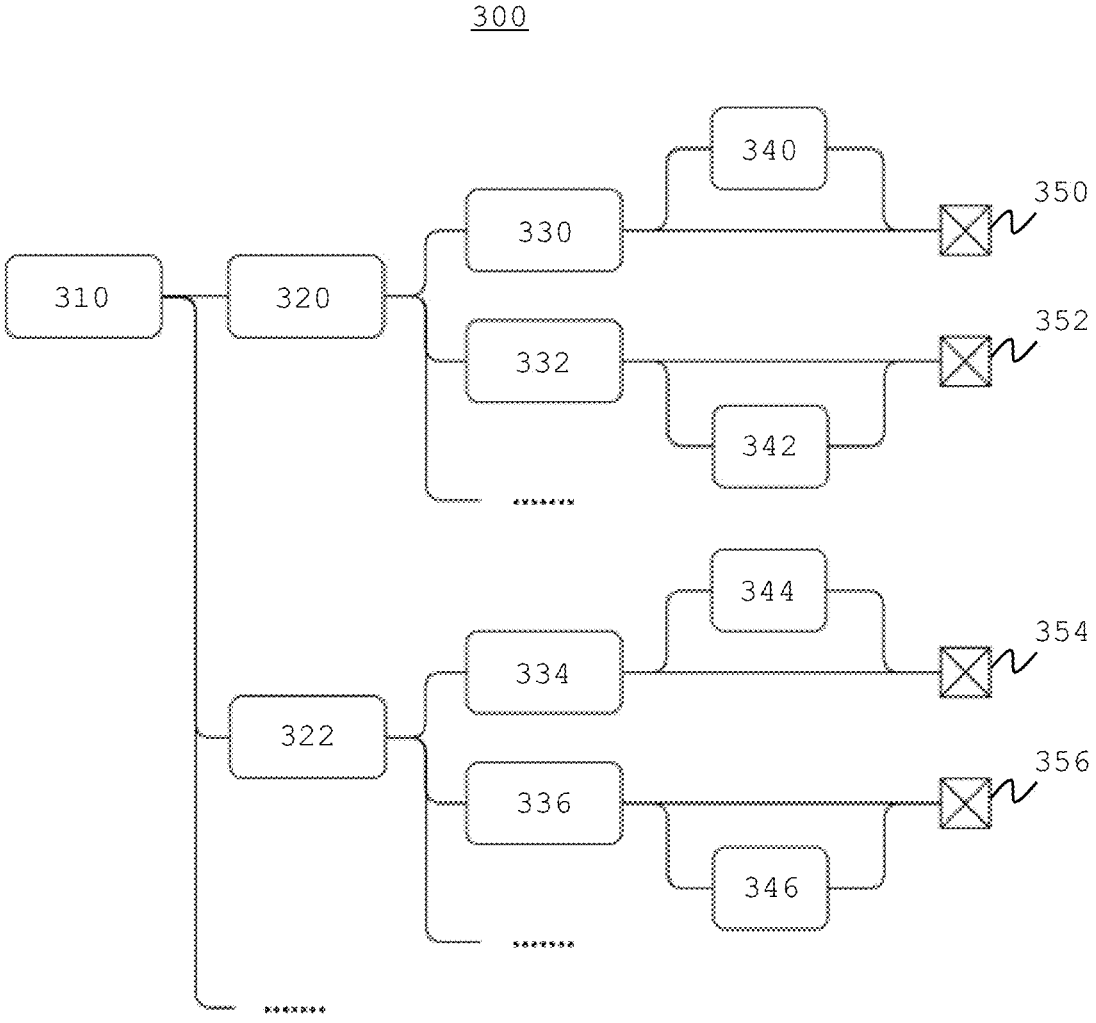
FIG. 3 shows a structure of a parallel multi-port system of another example embodiment of the present disclosure.

FIG. 3 shows a structure of a parallel multi-port system 300 of another example embodiment of the present disclosure. Ports 350-356 are shown, each controlled by a port controller 330-336. In case the ports are charging ports, a power loop 340-346 may be included per port. A power loop may be part of a port controller. Multiple processors 320-322 control the ports 350-356 via the port controllers 330-336, in this example a first processor 320 for ports 350-352 and port controllers 330-332 and a second processor 322 for ports 354-356 and port controllers 334-336. The processors operate based on software code 310. Similar to software code 210, software code 310 differs from software code 110 in that it has been adapted to include a common software code portion common to all processors 320-322 (and thus common to all ports 350-356 and port controllers 330-336) and a port specific code portion including port specific software code. The dots indicate that there may be any number of processors/port controllers/power loops/ports.

In the parallel multi-port system 300, each processor 320-322 may control the respective ports' activities in parallel and may operate independently. This allows the processors 320-322 to operate at a lower speed compared to the processor 120 of the conventional system 100, thereby lowering processor requirements.

The processors 320-322 may execute the same software code 310 including unified (i.e., common) function codes and port specific configuration data, allowing much smaller size of code memory and saving in chip area even with the additional processors.

In the example of FIG. 3, each processor 320-322 controls a subsection of the ports 350-356 and/or port controller 330-336. When adding a port with existing functions to the system 300, it may not be necessary to modify the unified function code in the common software code portion. Adding port specific configuration data for the additional port to the port specific code portion of the software code 310 may suffice when adding a port to the system 300.

The processors 320-322 may operate independently to each other. A failure in one port 350-356 or a failure in one port controller 330-336 may cause the respective processor 320-322 to reboot or switch off without affecting the ports and port controllers controlled by the other processors. As a result, the whole system 300 is much more robust compared to the conventional system 100.

Figure 4:
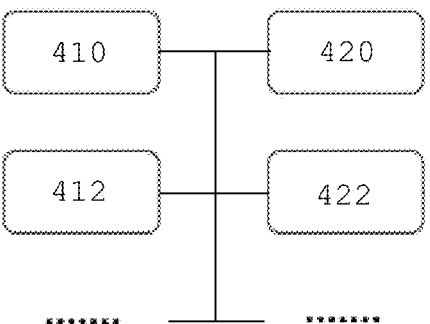
FIG. 4 shows an alternative memory configuration of a parallel multi-port system of another example embodiment of the present disclosure.

Preferably, the processors 220-224, 320-322 make use of a single software code, such as software code 210 in the example of FIG. 2 or software code 310 in the example of FIG. 3. Alternatively, multiple software codes may be used for multiple processors, such as shown in FIG. 4, where a part of a structure of a parallel multiple-port system 400 is shown, showing processors 420, 422 and two software codes 410, 420. The software code 410 includes, e.g., a common software code portion for the first processor 420 and a port and/or port controller specific software code portion for one or more ports controlled by the first processor 420. The software code 412 includes, e.g., a common software code portion for the second processor 422 and a port and/or port controller specific software code portion for one or more ports controlled by the second processor 422.

The software code 210, 310, 410, 412 may be stored in a non-volatile memory (NVM). NVM is commonly used in microcontrollers, embedded systems, and other devices where the program code needs to be stored permanently. It allows the system to retain the code even after power cycles or resets, ensuring that the program instructions are not lost. The software code 210, 310, 410, 412 may be part of a firmware of the parallel multiple-port system 200, 300, 400.

Figure 5:
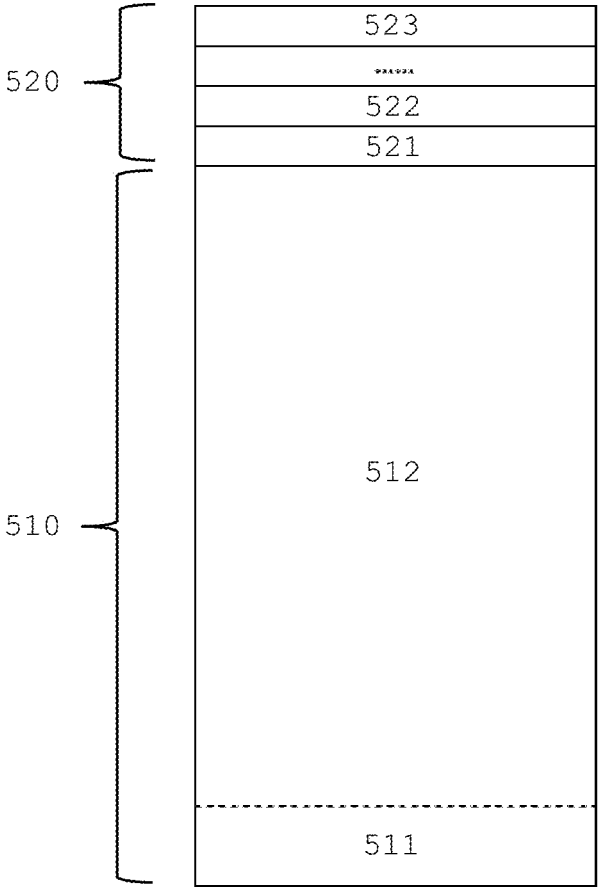
FIG. 5 shows a structure of a software code of an example embodiment of the present disclosure.

FIG. 5 shows a more detailed example of a structure of a software code 500, which may be used for the software codes 210, 310, 410, 412. The software code 500 may include a common software code portion 510 and a port and/or port controller specific software code portion 520.

The common software code portion 510 may include boot codes 511 and/or function codes 512 that are executable by multiple processors, e.g., processors 220-224 in the example of FIG. 2 or processors 320-322 in the example of FIG. 3.

The port/port controller specific code portion 520 may include port specific and/or port controller specific configuration data 521-523. In the example of FIG. 2, the port/port controller specific configuration data 521 defines, e.g., configuration data related to port 250, the port/port controller specific configuration data 522 defines, e.g., configuration data related to port 252, and the port/port controller specific configuration data 523 defines, e.g., configuration data related to port 254. In the example of FIG. 3, the port/port controller specific configuration data 521 defines, e.g., configuration data related to port 350, the port/port controller specific configuration data 522 defines, e.g., configuration data related to port 352, the port/port controller specific configuration data 523 defines, e.g., configuration data related to port 354, and a further port/port controller specific configuration data (not shown in FIG. 5) defines, e.g., configuration data related to port 356.

The boot codes 511 may include code to identify the configuration area in code memory according to processor identification. In an example of a parallel multi-port system with four ports being controlled by four processors, the boot codes 511 (in pseudo code) may be structured as follows:

```
< Boot codes 511 > if (processor_id == 1)
    Configuration_Start_Address = 0xFF10
else if (processor_id == 2)
    Configuration_Start_Address = 0xFF20
else if (processor_id == 3)
    Configuration_Start_Address = 0xFF30
else if (processor_id == 4)
    Configuration_Start_Address = 0xFF40
```

Preferably, the function codes 512 include a main, generic program without processor or port identifications. In the example with four ports being controlled by four processors, the function codes 512 (in pseudo code) may be structured as follows:

```
< Function codes 512 > int main ( ) {
    // load configurations from code memory to local registers
    for (addr = Configuration_Start_Address; addr < 16; addr++) {
        configuration_register[addr] = Code_Memory[addr];
    }
    // function code
```

-continued

```
< Function codes 512 >

Result = configuration_register[0] + configuration_register[1];
}
```

In the example with four ports being controlled by four processors, the port/port controller specific code portion 520 may then be structured as follows:

```
Configuration data for port 4 at NVM address 0xFF40-0xFF4F
Configuration data for port 3 at NVM address 0xFF30-0xFF3F
Configuration data for port 2 at NVM address 0xFF20-0xFF2F
Configuration data for port 1 at NVM address 0xFF10-0xFF1F
```

In the above example, adding a processor and additional port/port controller to the system 500 is as simple as adding a configuration start address to the Boot codes 511 and adding port specific configuration data to the port/port controller specific code portion 520 at the configured configuration start address. Unused configuration start addresses may already be present in the Boot codes 511, enabling that only the configuration data needs to be added to the controller specific code portion 520 when adding a processor/port controller/port to the system 500.

The parallel multi-port system 200, 300, 400 of the present disclosure may advantageously be used in multiple-port USB adapters including different types of ports, such as type-C USB ports and type-A USB ports. The present disclosure is not limited to USB adapters or these specific USB type ports and may be used in any electronic device with multiple ports, such as chargers, power banks, docking stations, etcetera.

Figure 6:
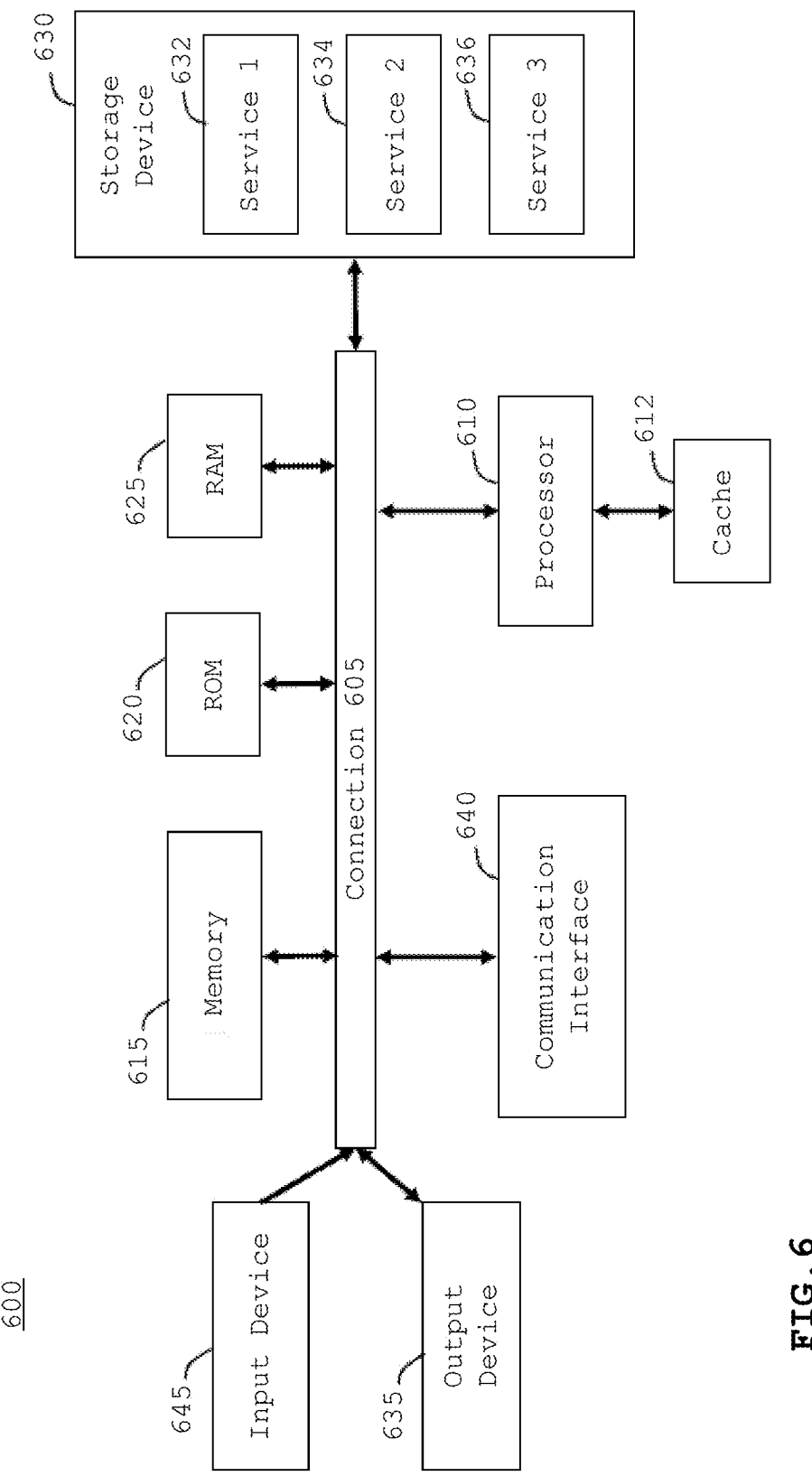
FIG. 6 shows an example embodiment of a computing system.

FIG. 6 shows an example embodiment of a computing system 600 for implementing certain aspects of the present technology. In various examples, the computing system 600 can be any computing device making up any part of the parallel multi-processor system 200, 300, 400 described herein.

In some implementations, a computing system 600 can implement the methods described herein.

The computing system 600 can include any component of a computing system described herein which the components of the system are in communication with each other using connection 605. The connection 605 can be a physical connection via a bus, or a direct connection into processor 610, such as in a chipset architecture. The connection 605 can also be a virtual connection, networked connection, or logical connection.

The example system 600 includes at least one processing unit (CPU or processor) 610 and a connection 605 that couples various system components including system memory 615, such as read-only memory (ROM) 620 and random-access memory (RAM) 625 to processor 610. The computing system 600 can include a cache of high-speed memory 612 connected directly with, in close proximity to, or integrated as part of the processor 610.

The processor 610 can include any general-purpose processor and a hardware service or software service, such as services 632, 634, and 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction, the computing system 600 may include an input device 645, which can represent any number of input mechanisms, such as a microphone for speech, a touch-sensitive screen for gesture or graphical input, keyboard, mouse, motion input, speech, etc. The computing system 600 can also include an output device 635, which can be one or more of a number of output mechanisms known to those of skill in the art. In some instances, multimodal systems can enable a user to provide multiple types of input/output to communicate with the computing system 600. The computing system 600 can include a communications interface 640, which can generally govern and manage the user input and system output. There is no restriction on operating on any particular hardware arrangement, and therefore the basic features here may easily be substituted for improved hardware or firmware arrangements as they are developed.

A storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as a processor 610, a connection 605, an output device 635, etc., to carry out the function.

What is claimed is:

1. A parallel multiple-port system, comprising:
a plurality of ports;
a plurality of processors; and
a memory storing software code which, when executed by the plurality of processors, causes the processors to control the plurality of ports,
wherein the plurality of processors has a first processor that is configured to control a first port of the plurality of ports,
wherein the plurality of processors has a second processor that is different from the first processor and is configured to control a second port of the plurality of ports different from the first port,
wherein the software code comprises a common software code portion relevant to the plurality of ports and for execution by the plurality of processors, and
wherein the software code further comprises a port specific code portion comprising first configuration data for the first port and for execution by the first processor, the port specific code portion further comprising second configuration data for the second port and for execution by the second processor.

2. The parallel multiple-port system according to claim 1, further comprising:
a plurality of port controllers, wherein each port controller is configured to control one of the plurality of ports, and
wherein the plurality of processors are configured to control the ports via the plurality of port controllers.

3. The parallel multiple-port system according to claim 1, wherein the first processor is configured to control a first subset of the plurality of ports, and
wherein the second processor is configured to control a second subset of the plurality of ports.

4. The parallel multiple-port system according to claim 1, wherein the common software code portion comprises boot codes,
wherein the boot codes links each processor to a memory address in the port specific code portion, and
wherein the memory address points to configuration data of one port.

5. The parallel multiple-port system according to claim 1, wherein the common software code portion comprises function codes,
and wherein the function codes comprises a generic program of the parallel multi-port system without processor or port identifications.

6. The parallel multiple-port system according to claim 1, wherein the ports are charging ports.

7. The parallel multiple-port system according to claim 2, wherein the first processor is configured to control a first subset of the plurality of ports, and
wherein the second processor is configured to control a second subset of the plurality of ports.

8. The parallel multiple-port system according to claim 2, wherein the common software code portion comprises boot codes,
wherein the boot codes link each processor to a memory addresses in the port specific code portion, and
wherein the memory address points to configuration data of one port.

9. The parallel multiple-port system according to claim 2, wherein the common software code portion comprises function codes,
and wherein the function codes comprises a generic program of the parallel multi-port system without processor or port identifications.

10. The parallel multiple-port system according to claim 2, wherein the ports are charging ports.

11. The parallel multiple-port system according to claim 6, further comprising a plurality of power loops, wherein each power loop is configured to provide power to one of the charging ports.

12. The parallel multiple-port system according to claim 6, wherein the ports are USB ports.

13. The parallel multiple-port system according to claim 11, wherein the ports are USB ports.

14. A computer program stored in a non-volatile computer executable program memory comprising instructions which, when the program is executed by a plurality of processors of a parallel multi-port system, cause the plurality of processors to control a plurality of ports, cause a first processor of the plurality of processors to control a first port, and cause a second processor of the plurality of processors different from the first processor to control a second port different from the first port,
wherein the program comprises a common software code portion relevant to the plurality of ports and for execution by the plurality of processors, and
wherein the program further comprises a port specific code portion comprising first configuration data for the first port and for execution by the first processor, the port specific code portion further comprising second configuration data for the second port and for execution by the second processor.

15. The computer program according to claim 14, wherein the common software code portion comprises boot codes, wherein the boot codes links each processor to a memory addresses in the port specific code portion, and wherein the memory address links to configuration data of one port.

16. The computer program according to claim 14, wherein the common software code portion comprises function codes, and wherein the function codes comprises a generic program of the parallel multi-port system without processor or port identifications.

17. The computer program according to claim 15, wherein the common software code portion comprises function codes, and wherein the function codes comprises a generic program of the parallel multi-port system without processor or port identifications.

* * * * *